US012569818B2

(12) United States Patent (10) Patent No.: US 12,569,818 B2
Bjerrisgaard (45) Date of Patent: Mar. 10, 2026

(54) SHAFT SUPPORT FOR SUPPORTING AN AGITATOR SHAFT AND AN AGITATOR

(71) Applicant: ALFA LAVAL CORPORATE AB, Lund (SE)

(72) Inventor: Søren Thorøe Bjerrisgaard, Vamdrup (DK)

(73) Assignee: ALFA LAVAL CORPORATE AB, Lund (SE)

( * ) Notice: Subject to any disclaimer, the term of this patent is extended or adjusted under 35 U.S.C. 154(b) by 844 days.

(21) Appl. No.: 17/783,412

(22) PCT Filed: Dec. 9, 2020

(86) PCT No.: PCT/EP2020/085246
§ 371 (c)(1),
(2) Date: Jun. 8, 2022

(87) PCT Pub. No.: WO2021/116162
PCT Pub. Date: Jun. 17, 2021

(65) Prior Publication Data
US 2023/0009788 A1 Jan. 12, 2023

(30) Foreign Application Priority Data

Dec. 11, 2019 (EP) ..................................... 19215234

(51) Int. Cl.
*B01F 35/00* (2022.01)
*B01F 27/90* (2022.01)
(Continued)

(52) U.S. Cl.
CPC .......... *B01F 35/4121* (2022.01); *B01F 27/90* (2022.01); *B01F 27/91* (2022.01);
(Continued)

(58) Field of Classification Search
CPC B01F 35/4121; B01F 27/91; B01F 2035/352; B01F 27/90; B01F 2035/35
See application file for complete search history.

(56) References Cited

U.S. PATENT DOCUMENTS

| | | | |
|---|---|---|---|
| 4,668,107 A | 5/1987 | Showalter | |
| 5,618,107 A | 4/1997 | Bartsch | |
| | | (Continued) | |

FOREIGN PATENT DOCUMENTS

| | | |
|---|---|---|
| CN | 1436936 A | 8/2003 |
| CN | 104583620 A | 4/2015 |
| | (Continued) | |

OTHER PUBLICATIONS

Office Action (Notice of Preliminary Rejection) issued on Feb. 20, 2024, in corresponding Korean Patent Application No. 10-2022-7023153 and English translation of the Office Action. (13 pages).
(Continued)

*Primary Examiner* — Anshu Bhatia
(74) *Attorney, Agent, or Firm* — BUCHANAN INGERSOLL & ROONEY PC

(57) ABSTRACT

The disclosure relates to a shaft support for supporting a lower portion of a rotatable shaft of an agitator configured to be installed in a tank, the shaft support comprising a support ring with an inwardly facing bearing surface configured to form a slide bearing journaling a lower portion of the rotatable shaft, wherein the bearing surface has a non-circular shape in a plane having a normal parallel to the shaft axis.

24 Claims, 6 Drawing Sheets

(51) Int. Cl.

| | | |
|---|---|---|
| *B01F 27/91* | (2022.01) | |
| *B01F 35/41* | (2022.01) | |
| *F16C 17/02* | (2006.01) | |
| *B01F 35/30* | (2022.01) | |

(52) U.S. Cl.

CPC ........ *F16C 17/028* (2013.01); *B01F 2035/35* (2022.01); *B01F 2035/352* (2022.01); *F16C 2320/16* (2013.01)

(56) References Cited

U.S. PATENT DOCUMENTS

| | | | |
|---|---|---|---|
| 6,386,753 | B1 | 5/2002 | Blakley |
| 7,387,431 | B2 | 6/2008 | Blakley |
| 10,557,498 | B1 | 2/2020 | Bischof et al. |
| 2003/0179966 | A1 | 9/2003 | Hojo et al. |
| 2005/0201646 | A1 | 9/2005 | Nagata et al. |
| 2013/0149140 | A1* | 6/2013 | Chang ................... F16C 17/028 384/276 |
| 2016/0223014 | A1* | 8/2016 | Nakamura .......... F16C 33/1085 |
| 2017/0312713 | A1 | 11/2017 | Schöb |

FOREIGN PATENT DOCUMENTS

| | | | |
|---|---|---|---|
| CN | 105771847 | A | 7/2016 |
| CN | 109869411 | A | 6/2019 |
| CN | 209457988 | U | 10/2019 |
| EP | 2693017 | A1 | 2/2014 |
| EP | 2998596 | A1 | 3/2016 |
| EP | 3130812 | A1 | 2/2017 |
| JP | S5765412 | A | 4/1982 |
| JP | H0610945 | A | 1/1994 |
| JP | H11336744 | A | 12/1999 |
| JP | 2000161346 | A | 6/2000 |
| JP | 2001234923 | A | 8/2001 |
| JP | 3173801 | U | 2/2012 |
| KR | 200387525 | Y1 | 6/2005 |
| WO | 2017203880 | A1 | 11/2017 |

OTHER PUBLICATIONS

International Search Report (PCT/ISA/210) and Written Opinion (PCT/ISA/237) mailed on Feb. 5, 2021, by the European Patent Office as the International Searching Authority for International Application No. PCT/EP2020/085246.

The First Office Action issued on Apr. 29, 2023 by the China National Intellectual Property Administration in Chinese Patent Application No. 202080085738.6 and an English translation of the Office Action. (21 pages).

* cited by examiner

SHAFT SUPPORT FOR SUPPORTING AN AGITATOR SHAFT AND AN AGITATOR

FIELD OF INVENTION

The invention relates to a shaft support for supporting a lower portion of a rotatable shaft extending downwardly along a shaft axis from a drive arrangement. The invention also relates to an agitator configured to be installed in a tank.

TECHNICAL BACKGROUND

Chemical and food processing operations often employ mixing tanks including a vertical agitator shaft which extends down into a tank and which carries agitator blades for agitating or mixing the product or products in the tank. The agitator shaft is typically supported or guided by a shaft support, supporting a lower end of a rotatable shaft.

One problem often encountered is that vibrations occurs. This is often due to forces caused by radial displacement of the agitator shaft. Radial displacement is more common for long and slender agitator shafts than it is for thicker shafts. Vibrations are typically undesirable since they typically increase wear of the components and since they may have a negative impact on the function of the agitator. To address this issue of undesired vibrations, there has been presented numerous attempts to provide elaborated shaft supports.

However, the provision of an elaborate shaft support typically has a negative impact on cleanability.

Various shaft supports are e.g. disclosed in U.S. Pat. Nos. 6,386,753, 7,387,431 and 5,618,107.

In U.S. Pat. No. 6,386,753 there is disclosed a shaft support in a mixing vessel having a support ring with strut pairs with an inclination angle between the struts in each pair to maintaining radial support of the shaft and to resist torsional forces. The strut pair assemblies extend radially outwardly from the shaft and are attached to the vessel wall to support the bearing holder. Such a configuration is complicated to manufacture and to install.

U.S. Pat. No. 7,387,431 approaches the problems associated with the cleaning of a shaft support. There is disclosed a sanitary shaft support having a bearing assembly supported by legs welded to the bottom of the vessel. It is said that this shaft has the advantages of easy cleanability and easy replacement of wear parts without disturbing the rest of the agitator. However, design of the support shaft is complicated since it comprises a plurality of bushings and other ring-shaped elements interconnected to each other and it sets high demands on alignment when installing the shaft support relative to the shaft.

In U.S. Pat. No. 5,618,107 there is disclosed a bearing assembly in a bottom mounted shaft support for an agitator. The bearing assembly is provided with a locking mechanism having J-shaped grooves and pins interacting with the grooves. Such a design makes it difficult to clean the shaft support. In order to somewhat address the cleaning issue, the bearing assembly includes a plurality of circumferentially spaced axially extended grooves in the inner and outer peripheries, which are said to facilitate cleaning of the bearing assembly in place.

Thus, there is still room for improvements when it comes to providing a shaft support which is able to eliminate vibrations in a robust and cost-efficient manner, which is easy to install, and which is able to be easily and efficiently cleaned.

SUMMARY OF INVENTION

In view of that stated above, the object of the present invention is to provide a design that adequately addresses the design criteria concerning easy installation, eliminate vibrations and being easy and efficient to clean.

According to a first aspect this object has been achieved by a shaft support supporting a lower portion of a rotatable shaft extending downwardly along a shaft axis from a drive arrangement. The shaft support comprises:

a support ring extending around a central geometrical axis and being configured to circumscribe the lower portion of the rotatable shaft, the support ring having an inwardly facing bearing surface configured to form a slide bearing journaling the lower portion of the rotatable shaft, wherein the bearing surface has a non-circular shape, as seen in a projection in a plane having a normal parallel to the shaft axis, in the sense that a first distance, which is measured in a first direction in the plane and which forms a longest distance between the bearing surface and a circle representing an outer envelope surface of the shaft is larger than a second distance, which is measured in a second direction in the plane and which forms a shortest distance between the bearing surface and the circle representing the outer envelope surface of the shaft, wherein the second distance is less than 70%, preferably less than 65% and more preferably less than 60% of the first distance of the first distance.

The available choices of the values of the second distance $d_2$ may in such a case be described with the formula, $0 < d_2 < Y \times d_1$, where Y is 0.7, preferably 0.65, and more preferably 0.6, where $d_1$ is the first distance.

Most preferably it has been found that the second distance $d_2$ should be less than 56% of the distance $d_1$. The available choices of the values of the second distance $d_2$ may in such a case be described with the formula, $0 < d_2 < 0.56 \times d_1$.

According to a second aspect the above object has also been achieved by an agitator configured to be installed in a tank, the agitator comprising:

a drive arrangement, an agitator shaft being provided with agitator blades and being configured to extend downwardly from the drive arrangement along a shaft axis and to be rotated about the shaft axis by the drive arrangement, and a shaft support, wherein the shaft support is of the kind introduced above and disclosed in more details below.

Specifically, the agitator of the second aspect may be worded as an agitator configured to be installed in a tank, the agitator comprising:

a drive arrangement, an agitator shaft being provided with agitator blades and being configured to extend downwardly from the drive arrangement along a shaft axis and to be rotated about the shaft axis by the drive arrangement, and a shaft support, wherein the shaft support comprises a support ring extending around a central geometrical axis and being configured to circumscribe the lower portion of the rotatable shaft, the support ring having an inwardly facing bearing surface configured to form a slide bearing journaling the lower portion of the rotatable shaft, wherein the bearing surface has a non-circular shape, as seen in a projection in a plane having a normal parallel to the shaft axis, in the sense that a first distance, which is measured in a first direction in the plane and which forms a longest distance between the bearing surface and a circle representing an outer envelope surface of the shaft is larger than a second distance, which is measured in a second direction in the plane and which forms a shortest distance between the bearing surface and the circle representing the outer envelope surface of the shaft, wherein the second distance is less than 70%, preferably less than 65% and more preferably less than 60% of the first distance of the first distance.

As mentioned above, the shaft support is configured to support a lower portion of a rotatable shaft extending downwardly along a shaft axis from a drive arrangement. The drive arrangement is configured to rotate the agitator shaft about the shaft axis. Thus, the support structure and the lower portion of the rotatable shaft are configured to interact when the agitator shaft is rotating. The agitator shaft will rotate inside the support ring of the shaft support and will be journaled by the bearing surface having a non-circular shape.

By designing the shaft support and the agitator with a bearing surface with the non-circularity as introduced above, and as disclosed in more detail below, there is provided a shaft support which counter-acts build-up of vibrations in the agitator in a robust manner. This non-circularity disturbs a rolling effect which otherwise may occur. The rolling effect occurs when the lower portion of the agitator shaft starts to roll on the curvature of the support ring instead of sliding. However, since the rolling effect in a sense makes the shaft and bearing surface to temporarily act as an internal gear, the difference in the rotation of the shaft and the rolling results in that the rolling effect is repeatedly lost, which in turn results in vibrations. Thus, the non-circularity disturbs the rolling effect which otherwise may occur and thereby counter-acts the occurrence of vibration building up otherwise often occurring. By counter-acting the vibration build-up it becomes possible to use comparably slender agitator shafts, which in turn is cost-effective and which also reduces the weight of the agitator shaft.

Moreover, the design also provides the advantage of counter-acting vibration build up, by a shaft support which may be formed of a comparable small number of components and components that may be manufactured in a cost-efficient manner. Moreover, the robustness of the design makes it easy to install the shaft support together with the agitator.

The lower portion of the agitator shaft may be provided with a bushing configured to interact with the bearing surface of the shaft support.

The provision of a bushing on the lower portion of the agitator shaft may be used as an indicator where the inter-action with support ring of the shaft support is intended to be formed. This may be used as a guide or a control-feature facilitating an easy and correct installation. The bushing may be configured to provide a reduced friction when sliding on the bearing surface. Moreover, the provision of a bushing may also be used to provide a suitable combination of materials of the bearing surface and the bushing. A suitable combination of materials may e.g. be selected such that is the bushing which is worn, and the bearing surface is not worn, or at least only worn to a small extent, whereby maintenance is facilitated.

It may in this context be noted that the feature—a circle representing an outer envelope surface of the shaft—is introduced to take into account that the actual envelope surface of the lower portion of the shaft formed of the shaft as such or of the bushing may have a shape deviating from a circular shape to such an extent that it has an impact on the determination of the first and second distances. The circle representing an outer envelope surface of the shaft is in such a case typically a circle with a diameter being equal to the nominal outer diameter of the shaft or bushing. However, the outer envelope surface of the shaft and/or of the bushing of the shaft may be cylindrical, which implies a circular cross-section of the shaft and/or the bushing of the shaft. This corresponds in other words to that the lower portion of the shaft is cylindrical.

In case of a cylindrical outer envelope surface and/or lower portion of the shaft, the first distance forms a longest distance between the bearing surface and the outer envelope surface of the shaft and the second distance forms a shortest distance between the bearing surface and the outer envelope surface of the shaft.

The non-circular shape of the bearing surface, as seen in the plane having a normal parallel to the shaft axis, may be provided by manufacturing, such as machining, the bearing surface such that it obtains a non-circular shape, such as an ellipsoid or oval shape.

The non-circular shape of the bearing surface, as seen in the plane having a normal parallel to the shaft axis, may at least partly be provided by the support ring being tilted relative to the plane having a normal parallel to the shaft axis. By this, the bearing surface may be circular in one plane and provides an ellipse shaped bearing surface when tilted and projected down into another plane. The other plane is the plane having a normal parallel to the shaft axis when the shaft support is interacting with the agitator. It is also advantageous in that in this case, the contact point between lower portion of the shaft and the bearing surface will move around the lower portion of the shaft and will simultaneously move up and down on the lower portion due to the tilt angle of the bearing surface. This reduces the wear of the lower portion of the shaft, since the wear will over time be distributed over a cylindrical surface compared to a line contact. In the preferred embodiment, the bearing surface is circular around a central axis and the non-circularity is provided fully by the support ring being tilted relative to the plane having a normal parallel to the shaft axis.

The bearing surface may be formed as an ellipse as seen in a projection in the plane having a normal parallel to the shaft axis.

By this, the bearing surface may be circular in one plane and provides an ellipse shaped bearing surface when tilted and projected down into another plane. The other plane is the plane having a normal parallel to the shaft axis when the shaft support is interacting with the agitator.

The ellipse shaped bearing, especially if provided by a circular bearing surface being tilted, provides counter-action of the vibrations without use of any additional components or advanced manufacture of the shaft support.

The bearing surface of the shaft support may extend circularly around the central geometrical axis of the support ring. This facilitates manufacture of the bearing surface of the support ring.

The bearing surface may have a convex cross-sectional shape, as seen in a radial plane extending radially from the central geometrical axis of the support ring, the bearing surface having a convex shape in the sense that a central portion of the bearing surface, as seen along the central geometrical axis, of the bearing surface bulges inwardly towards the central geometrical axis.

The convex cross-sectional shape of the bearing surface provides a smooth surface without any sharp edges. The provision of a convex bearing surface is especially useful if the non-circularity is provided by tilting a circular bearing surface.

The support ring is preferably made of metal. A support ring made of metal typically provides cost-efficient choose of material by providing a support ring which is easy to manufacture, and which typically is long-lived.

The bearing surface may be configured to allow the lower portion of the rotatable shaft to slidably move up and down relative to the bearing surface. One advantage is that it facilitates installation.

The bearing surface may have a continuous cross-sectional shape, as seen in a radial plane extending radially from the central geometrical axis of the support ring. Thereby, the bearing surface may allow the lower portion of the rotatable shaft to slidably move up and down relative to the bearing surface.

The bearing surface may have a convex cross-sectional shape, as seen in a radial plane extending radially from the central geometrical axis of the support ring. Thereby, the bearing surface may allow the lower portion of the rotatable shaft to slidably move up and down relative to the bearing surface.

Moreover, it is also useful if the lower portion of the rotatable shaft is cylindrical and the bearing surface is tilted. In this case, the contact point between lower portion of the shaft and the bearing surface will move around the lower portion of the shaft and will simultaneously move up and down on the lower portion due to the tilt angle of the bearing surface. This reduces the wear of the lower portion of the shaft, since the wear will over time be distributed over a cylindrical surface compared to a line contact.

The shaft support may comprise a support structure configured to extend downwardly and to be attached to a bottom of a tank into which the rotatable shaft is intended to extend into or to a bottom of the tank in which the agitator is intended to be installed. By having the support structure attached to the bottom of the tank provides stability which addresses the design criteria of eliminating vibrations. It also makes it possible to provide an agitator able to blend the mixture in the entire tank since the agitator shaft with agitator blades may extend from the top of the tank down to the shaft support attached to the bottom of the tank.

The support structure may be configured to be attached centred relative to a geometrical point where the shaft axis intersects the bottom of the tank. This facilitates installation.

As mentioned above, the lower portion of the agitator shaft may be provided with a bushing configured to interact with the bearing surface of the shaft support.

The bushing may be composed of polymer-based or ceramic-based material, preferable a food grade material.

The bushing may be made of a material being softer than the material forming the bearing surface.

By having a bushing made of a material being softer than the material of the bearing surface it is possible to make the bushing being worn out before the bearing surface.

The agitator is preferably designed such that there is a radial play between the bearing surface and the lower portion of the agitator shaft. If there is a bushing present this would be that the agitator is preferably designed such that there is a radial play between the bearing surface and the bushing at the lower portion of the agitator shaft.

The radial play between the bearing surface and the shaft or bushing provides spaces for easy and efficient cleaning. The radial play may be sufficiently large to make possible to see if the bearing or bushing are worn out or about to become worn out.

The bearing surface may define a smallest geometrical cylinder of free space along the shaft axis, the smallest geometrical cylinder of free space may have a diameter being larger, preferably at least 1% larger, more preferably at least 5% larger, than the diameter of the lower portion of the agitator shaft, or the smallest geometrical cylinder of free space may have a diameter being larger than the diameter of the bushing at the lower portion of the agitator shaft if such a bushing is present. It may be noted that the diameter of the smallest geometrical cylinder of free space is the smallest distance appearing as measured between two opposing points of the bearing surface.

The invention may also in short be said to relate to a shaft support for supporting a lower portion of a rotatable shaft of an agitator configured to be installed in a tank, the shaft support comprising a support ring with an inwardly facing bearing surface configured to form a slide bearing journaling a lower portion of the rotatable shaft, wherein the bearing surface has a non-circular shape in a plane having a normal parallel to the shaft axis.

BRIEF DESCRIPTION OF THE DRAWINGS

The invention will by way of example be described in more detail with reference to the appended schematic drawings, which shows a presently preferred embodiment of the invention.

FIG. 3b is an enlargement of part of FIG. 3a.

DETAILED DESCRIPTION OF PREFERRED EMBODIMENTS

Figure 1:
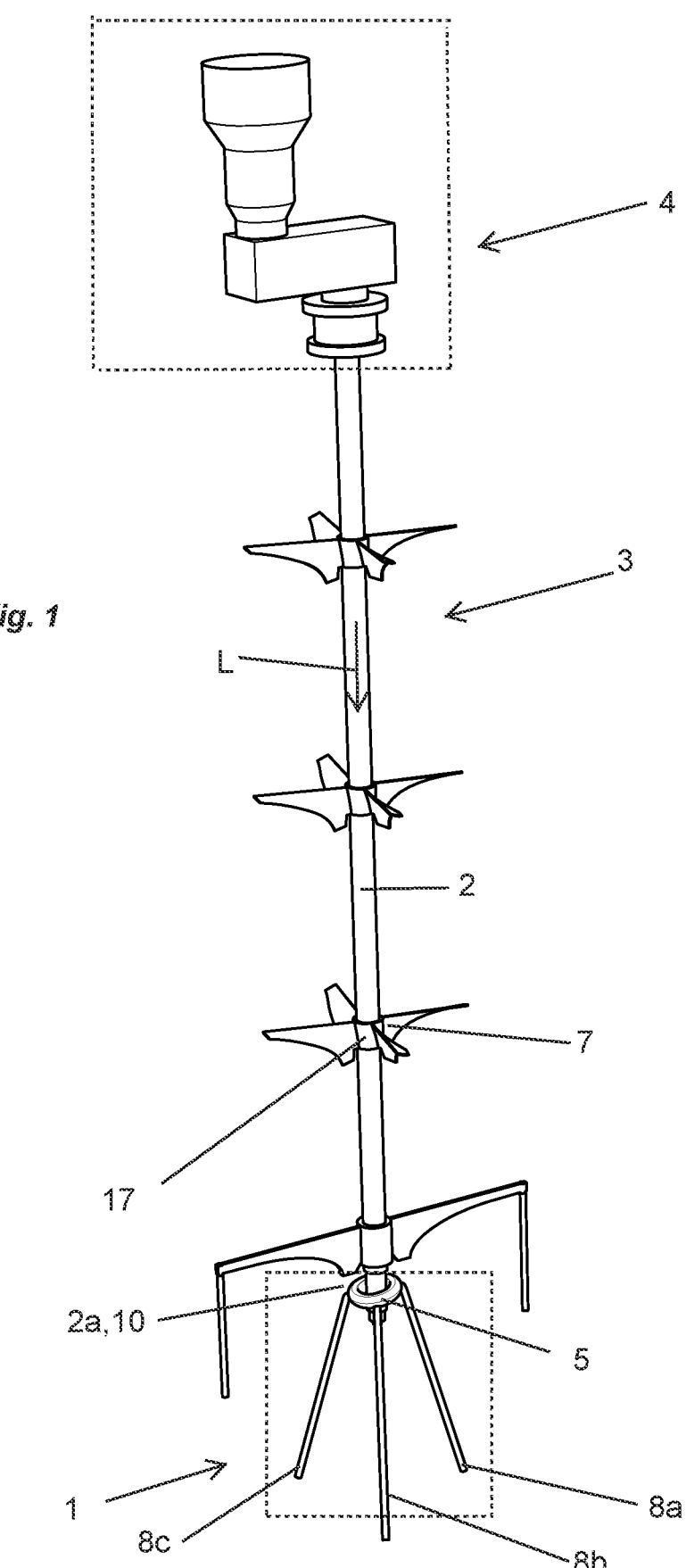
FIG. 1 discloses an agitator comprising a shaft provided with agitator blades, a drive arrangement and a shaft support.

In FIG. 1 there is disclosed an agitator 3 configured to be installed in a tank. The agitator 3 comprises a drive arrangement 4 and an agitator shaft 2. The agitator shaft 2 extends downwardly from the drive arrangement 4 along a shaft axis L down to a shaft support 1. The shaft axis L may also be referred to as a longitudinal direction L.

The drive arrangement 4 may e.g. be a motor, such as an electrical motor, a hydraulic motor or the like. Depending upon the working range of the motor when it comes to rotational speed and torque and the intended rotational speed and torque demand of the agitator shaft 2, the drive arrangement 4 may include a gear. The drive arrangement 4 may also comprise a clutch. The clutch may be used during start-up and shut-down. A clutch may also be used to release the connection between the motor and the agitator shaft 2 as a safety precaution, such as if the agitator shaft 2 becomes stuck.

The agitator shaft 2 is provided with a plurality of agitator blades 7. The agitator blades 7 are distributed along the shaft axis L and are provided along at least a portion of the shaft 2, from the drive arrangement 4 down towards the shaft support 1. The agitator blades 7 each extend outwardly from the agitator shaft 2. In the disclosed embodiment they extend perpendicular to the shaft axis L. In the disclosed embodiment there are four agitator blades 7 at each longitudinal position where there are provided blades. The blades are attached to a ring 17 which in turn encloses and is connected to a small portion of the agitator shaft 2. The agitator blades 7 are attached to the shaft 2 such that the blades 7 sweep around the shaft axis L when the shaft 2 is rotated by the drive arrangement 4. The actual design and configuration may be varied in a number of different ways.

As disclosed in FIG. 1, a lower portion of the rotatable shaft 2 is supported by the shaft support 1. The shaft support 1 comprises a support ring 5. The support ring 5 extends around a central geometrical axis C. The support ring 5 is configured to circumscribe the lower portion of the rotatable shaft 2. The agitator shaft 2 is configured to be inserted from the top of the support ring 5. The support ring 5 has preferably an extension along the shaft axis L and a position as seen along the shaft axis L such that the shaft 2 extends completely through the support ring 5. The support ring 5 is configured to be connected to a bottom or a wall, preferably the bottom, of the tank and be held in the intended position by a support structure 8a-c. The support structure 8a-c extends downwardly along the shaft axis L from the support ring 5.

The support ring 5 has an inwardly facing bearing surface 6 which is configured to form a slide bearing journaling the lower portion of the rotatable shaft 2. Thus, the bearing surface 6 of the shaft support 1 support a lower portion of the agitator shaft 2.

Figure 3A:
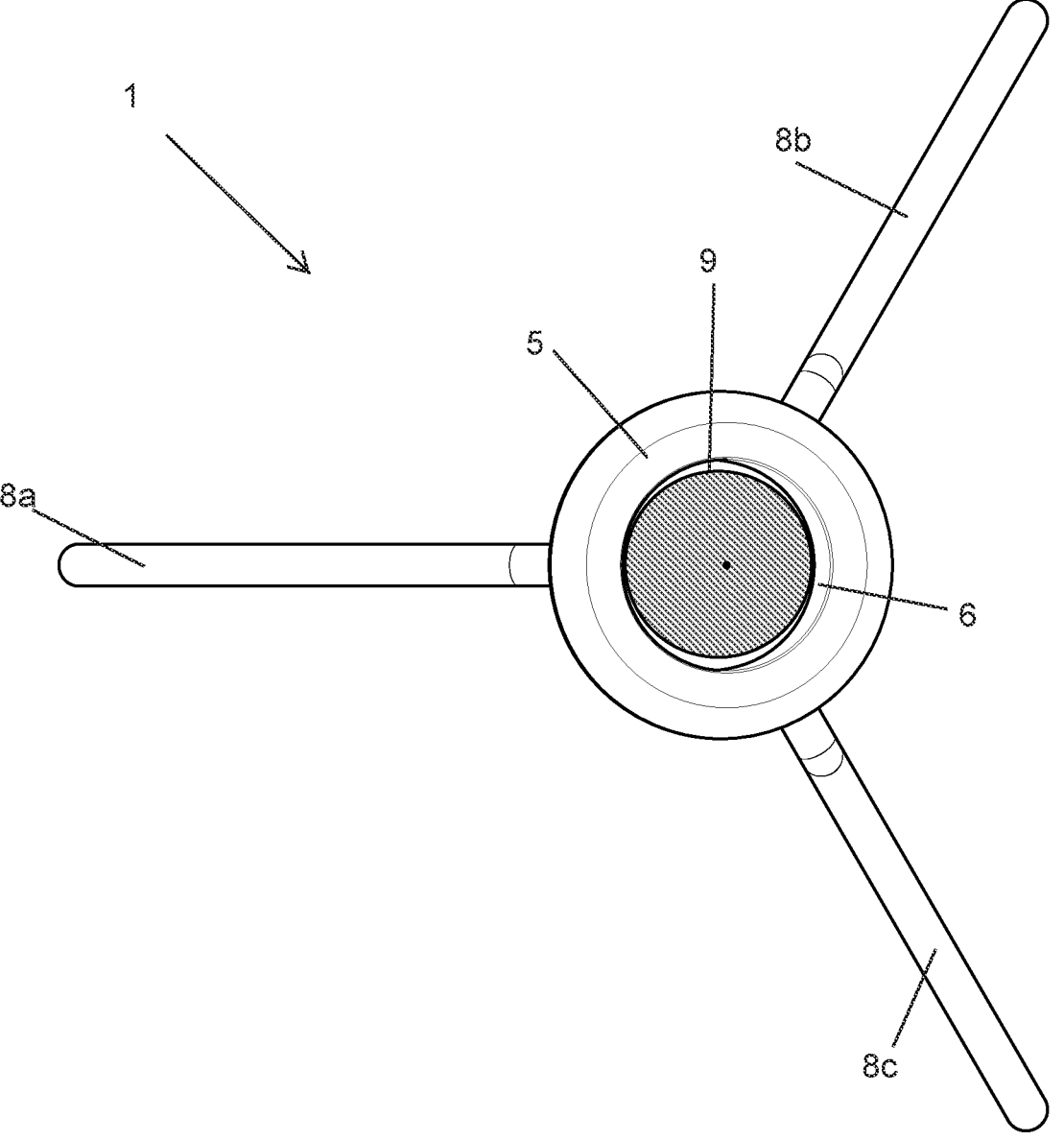
FIG. 3a is a top-plan view of the shaft support of FIGS. 1 and 2.
Figure 3B:
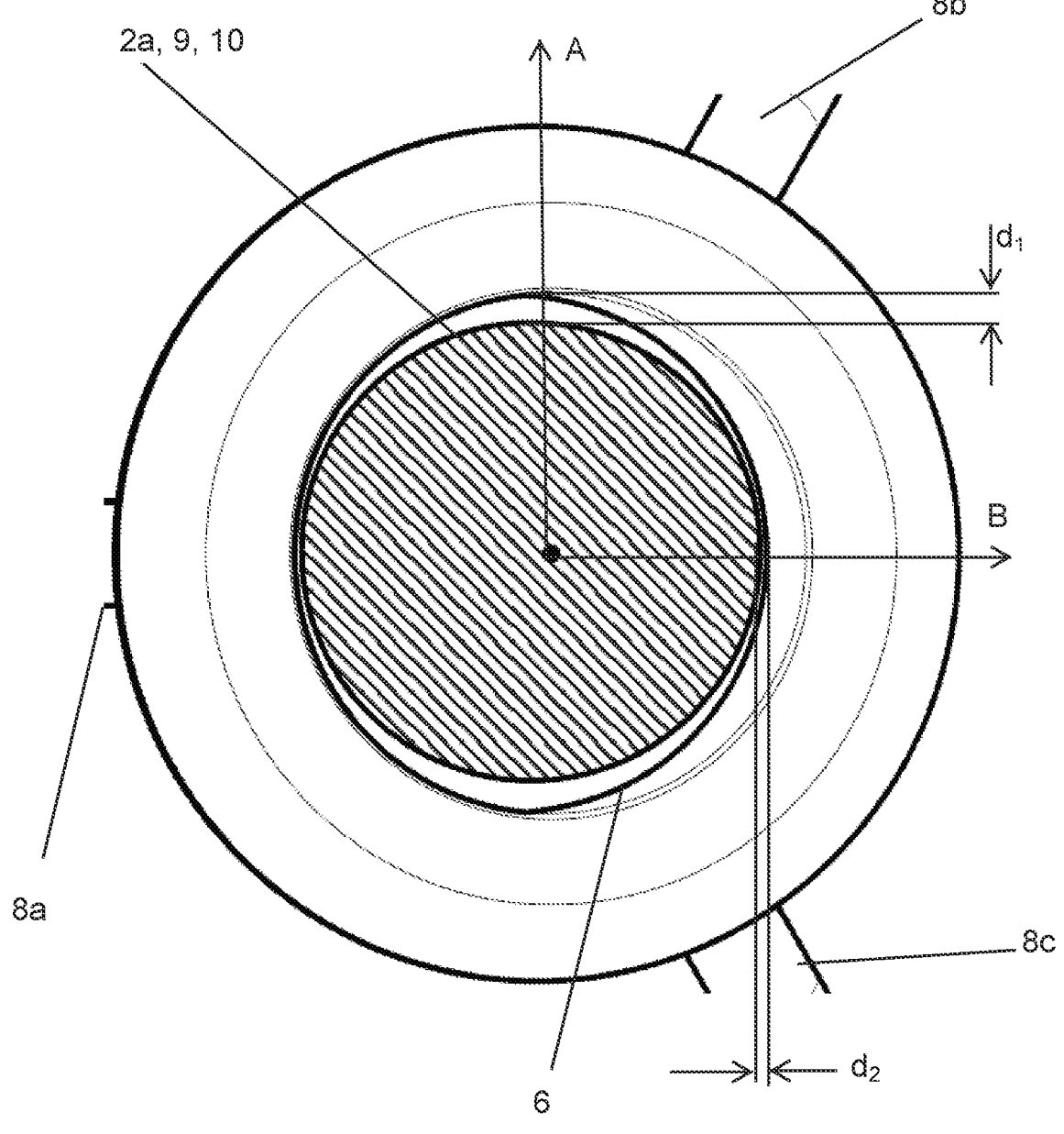
Figure 4:
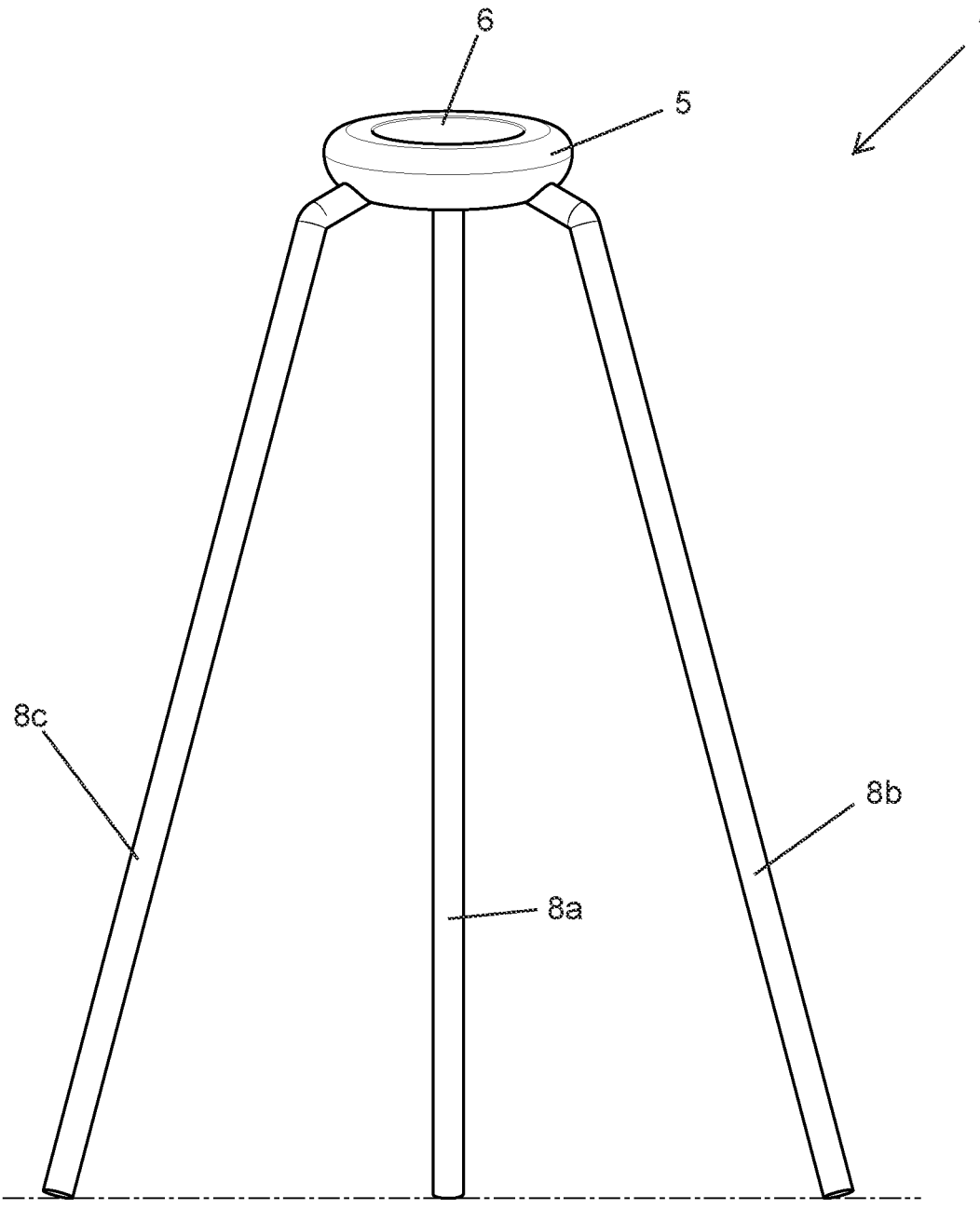
FIG. 4 is side view of the shaft support of FIGS. 1-3.

As shown in FIGS. 3a-b, the shape of the bearing surface 6 is non-circular as seen in the projection in a plane, the plane of the paper in FIGS. 3a and 3b, having a normal parallel to the shaft axis L. The shape of the bearing surface 6 may be non-circular in the sense that a first distance $d_1$, which is measured in a first direction in the plane and which forms a longest distance between the bearing surface 6 and a circle representing an outer envelope surface of the shaft 2 is larger than a second distance $d_2$, which is measured in a second direction in the plane and which forms a shortest distance between the bearing surface 6 and the circle representing the outer envelope surface of the shaft 2, wherein the second distance $d_2$ is less than 70%, preferably less than 65% and more preferably less than 60% of the first distance $d_1$. This non-circularity is provided in order to disturb the rolling effect and thereby to eliminate the vibration building up otherwise often occurring.

The available choices of the values of the second distance $d_2$ may in such a case be described with the formula, $0 < d_2 < Y \times d_1$, where Y is 0.7, preferably 0.65, and more preferably 0.6.

Most preferably it has been found that the second distance d2 should be less than 56% of the distance d1. The available choices of the values of the second distance $d_2$ may in such a case be described with the formula, $0 < d_2 < 0.56 \times d_1$.

The first distance $d_1$ may be said to be the longest distance between the bearing surface 6 and the circle representing the outer envelope surface of the shaft 2 and the second distance $d_2$ may be said to be the shortest distance between the bearing surface 6 and the circle representing the outer envelope surface of the shaft 2 in the same plane.

The non-circular shape of the bearing surface 6 may at least be partly provided by the support ring 5 being tilted relative to the plane P having a normal parallel to the shaft axis L. The bearing surface 6 may be formed as an ellipse as seen in a projection in the plane having a normal parallel to the shaft axis L. The difference between the first distance $d_1$ and the second distance $d_2$ is dependent on how much the support ring 5 becomes tilted. A larger tilt gives a larger difference between the first and the second distance, $d_1$ and $d_2$. The bigger the first distance $d_1$ is the bigger angle the support ring can be tilted. The support ring 5 may represent a bearing surface 6 having a circular shape in the plane having a normal parallel to the shaft axis L if not being tilted. Alternatively expressed, the support ring 5 may represent a bearing surface 6 having a circular shape in the plane having a normal parallel to the central axis C.

Figure 2:
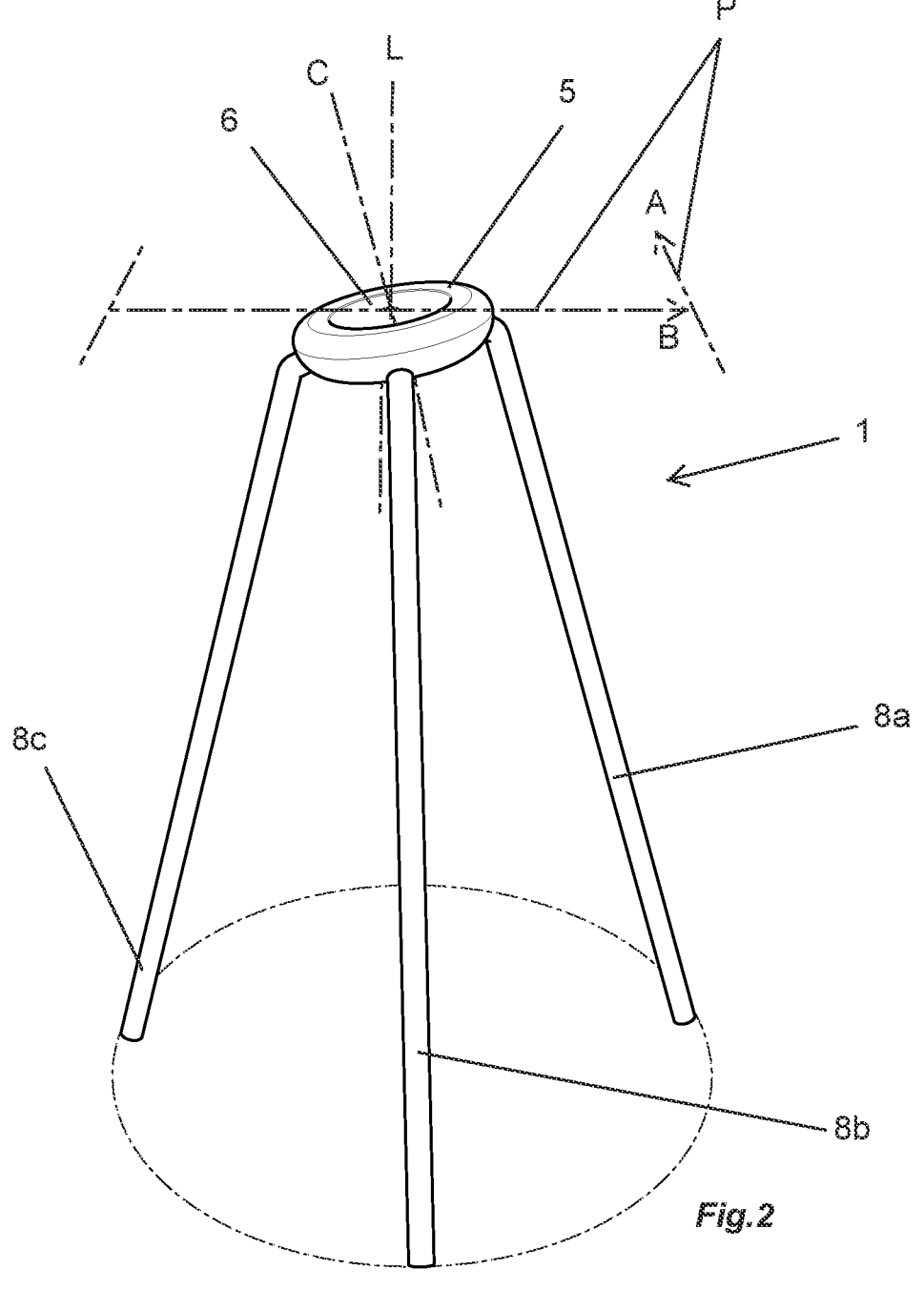
FIG. 2 is a perspective view of the shaft support of FIG. 1.

The shaft support 1 may comprise a support structure 8a-c configured to extend downwardly. The support structure 8a-c may be attached to a bottom of a tank into which the rotatable shaft 2 is intended to extend into. The support structure 8a-c may comprise rods 8a-c as can be seen in e.g. FIG. 1. Since support ring 5, in FIG. 1, has a circular shape and is tilted, the lengths of the rods 8a-c have been adjusted into different lengths to connect to the bottom of the tank. The rods 8a-c are typically designed such that each rod carries the same forces while the agitator shaft 2 is rotating. They are evenly distributed on the support ring 5 and their connection points on the bottom of the tank is evenly distributed, preferably evenly distributed on a common geometrical circle, as may be seen in FIG. 2.

The support structure 8a-c may be configured to be attached centred relative to a geometrical point where the shaft axis L intersects the bottom of the tank. In the disclosed embodiment this is provided by the common geometrical circle of the connection points of the rods 8a-c having a centre point coinciding with the geometrical point where the shaft axis L intersects the bottom of the tank The bearing surface 6 of the shaft support 1 may extend circularly around the central geometrical axis C of the support ring 5. The distance from the central geometrical axis C of the support ring 5 to the bearing surface 6 may be equal in each point in a plane, having normal parallel to the central geometrical axis C, around the circular extension of the bearing surface 6. The radial thickness of the support ring 5 is preferably uniform as seen along the circular shape around the central geometrical axis C, as e.g. may be seen in FIG. 2. The extension along the central geometrical axis C is preferably uniform as seen along the circular shape around the central geometrical axis C, as e.g. may be seen in FIG. 2.

Figure 5:
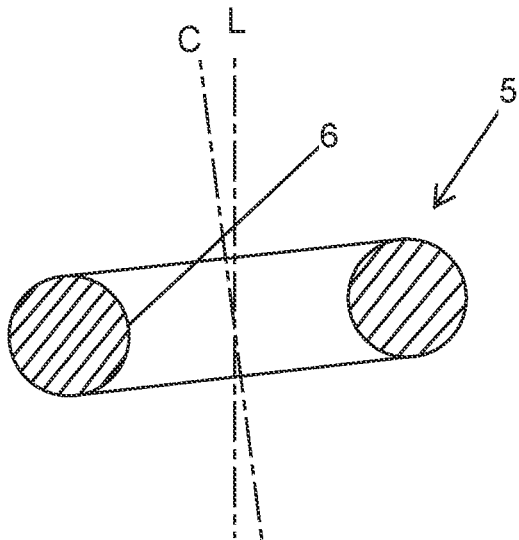
FIG. 5 is a cross-sectional view of a support ring of the shaft support.

As e.g. shown in FIG. 5, the bearing surface 6 may have a convex cross-sectional shape, as seen in a radial plane extending radially from the central geometrical axis C of the support ring 5. The shape is convex in the sense that a central portion of the bearing surface 6, as seen along the central geometrical axis C, of the bearing surface 6 bulges inwardly towards the central geometrical axis C. The convex shape is preferably uniform as seen along the bearing surface 6 extending around the central geometrical axis C. In the disclosed embodiment, the support ring 5 is shaped from a rod having a circular cross-section being bent into a circle. Thereby a convex bearing surface 6 is achieved in a robust and straight-forward manner. It may be noted that the bearing surface 6 may be machined to the convex cross-sectional shape. The bearing surface 6 may e.g. be based on a circular rod and be machined to provide a smoother surface than the surface formed by the circular rod as such. Such machined bearing surface 6 may e.g. have a radius of curvature being greater than the radius of the circular cross-section of the rod. The support ring may also be machined from a solid block such as a circular disk.

The support ring 5 may be made of a hard material which has durable properties. This material may for instance be a metal, as well as another material with similar durable properties. It may be noted that the support ring 5 may be manufactured from one material and the bearing surface 6 may be manufactured from another material. In such a case, the bearing surface 6 may e.g. be formed of an inlay, such as an internal bushing. In such a case, the material of the bearing surface 6 is typically harder and more wear-resistant than the material from which the body of the support ring 5 is formed.

The bearing surface 6 may be configured to allow the lower portion of the rotatable shaft 2 to slidable move up and down relatively to the bearing surface 6. The rotatable shaft 2 is slidable movable up and down in a longitudinal direction of the shaft axis L relative the bearing surface 6. It may in this context be noted that during normal operation, the agitator shaft 2 as such does typically not move up and down. However, the fact that the lower portion of the rotatable shaft 2 is slidable movable relative to the bearing surface 6 facilitates installation. Moreover, it makes it easy to provide the non-circularity by tilting the support ring 5 with its bearing surface 6. This is so since a tilted support ring 5 results in that the point of contact moves up and down on the lower portion of the support shaft 2, and by allowing the lower portion of the rotatable shaft 2 to be slidable movable relative to the bearing surface 6, the movement of the contact point is easily accommodated.

The bearing surface 6 may have a continuous cross-sectional shape, as seen in a radial plane extending radially from the central geometrical axis C of the support ring 5. This achieves the slidable movability of the lower portion of the rotatable shaft 2 relative to the bearing surface 6. The continuous cross-sectional shape of the bearing surface 6 provides a smooth surface in a vertical direction. The bearing surface 6 is thus free from irregularities such as steps and projections in a vertical direction.

The convex cross-sectional shape of the bearing surface 6 may also achieve and facilitate the slidable movability of the lower portion of the rotatable shaft 2 relative to the bearing surface 6.

The lower portion of the agitator shaft 2 may be provided with a bushing 10. The bushing 10 is configured to interact with the bearing surface 6 of the shaft support 1. The bushing 10 may be composed of a food grade material, since the applications of an agitator 3 often is used in food industry as well as industries where there is a high demand on good hygiene. A food grade material must be able to be easily and efficiently cleaned. The material is typically not allowed to emit toxins or small pieces of material. It is also an advantage if the material is able to slide with a low friction. Materials which fulfill these requirements are for examples a polymer-based or a ceramic-based materials.

The bushing 10 may be made of a material being softer than the material forming the bearing surface 6. When the bushing 10 is acting on the curvature of the bearing surface 6 friction will be accomplished. Thereby there is provided a greater tendency towards that the bushing 10 is to be replaced more often than the support ring 5. Since the bushing 10 at the lower portion of the agitator shaft 2 is comparably easy to replace, it is beneficial for the maintenance of the agitator 3 to have a bushing 10 being formed of a material being softer than the material chosen for the bearing surface 6.

The agitator 3 may be designed such that there is a a radial play between the bearing surface 6 and the lower portion of the agitator shaft 2 as may be seen e.g. in FIGS. 3a and 3b. If a bushing 10 is present, the agitator 3 may be designed such that there is a radial play between the bearing surface 6 and the bushing 10 at the lower portion of the agitator shaft 2. It may be noted that when the agitator shaft 2 rotates, it will typically abut somewhere on the bearing surface 6 inside the support ring 5, such that there is not a radial play around the complete circumference. However, the radial play will typically move around the inside of the support ring 5. Moreover, if the tank is emptied and cleaned, any cleaning fluid will act on the agitator shaft 2 and will typically move the agitator shaft 2 such that the cleaning fluid during the cleaning cycle will get access to all points of the bearing surface 6.

The bearing surface 6 may define a smallest geometrical cylinder of free space along the shaft axis L. The smallest geometrical cylinder of free space may have a diameter being larger than the diameter of the lower portion of the agitator shaft 2. If a bushing 10 is present, the smallest geometrical cylinder of free space may have a diameter being larger than the diameter of the bushing of the lower portion of the agitator shaft 2. Preferably, the smallest geometrical cylinder of free space has a diameter being at least 1% larger, more preferably 5% larger, than the diameter of the lower portion of the agitator shaft 2 or the bushing 10.

It is contemplated that there are numerous modifications of the embodiments described herein, which are still within the scope of the invention as defined by the appended claims.

The shaft support 1 may for instance have a differently designed support structure. It may e.g. have a different number of rods. It may e.g. have a ring structure interconnecting the lower ends of the rods. It may e.g. be designed as a box-structure, e.g. partly open or completely closed.

The number of agitator blades 7 may also differ due to the application and typically dependent on the solution that should be agitating. For example, the number of agitator blades may be 2, 3, 4, 5, 6 or more. The agitator blades 7 may further be of various shapes, sizes and material. The ring 17 which the agitator blades 7 are connected to could either be fixed or movable. The agitator blades 7 may be connected directly to the agitator shaft 2.

The diameter of the agitator shaft 2 and/or the distribution of the agitator blades 7 may vary along the agitator shaft 2.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. An agitator configured to be installed in a tank, the agitator comprising a drive arrangement, an agitator shaft being provided with agitator blades and being configured to extend downwardly from the drive arrangement along a shaft axis and to be rotated about the shaft axis by the drive arrangement, and a shaft support for supporting a lower portion of the agitator shaft, the shaft support comprising:

a support ring extending around a central geometrical axis and being configured to circumscribe the lower portion of the agitator shaft, the support ring having an inwardly facing bearing surface configured to form a slide bearing journaling the lower portion of the agitator shaft, the bearing surface having a non-circular shape, as seen in a projection in a plane having a normal parallel to the shaft axis, in the sense that a first distance, which is measured in a first direction in the plane and which forms a longest distance between the bearing surface and a circle representing an outer envelope surface of the agitator shaft is larger than a second distance, which is measured in a second direction in the plane and which forms a shortest distance between the bearing surface and the circle representing the outer envelope surface of the agitator shaft, the second distance being less than 70% of the first distance.

2. The agitator according to claim 1, wherein the non-circular shape of the bearing surface as seen in the plane having a normal parallel to the shaft axis, is at least partly provided by the support ring being tilted relative to the plane having a normal parallel to the shaft axis.

3. The agitator according to claim 1, wherein the bearing surface is formed as an ellipse as seen in a projection in the plane having a normal parallel to the shaft axis.

4. The agitator according to claim 1, wherein the bearing surface extends circularly around the central geometrical axis of the support ring.

5. The agitator according to claim 1, wherein the bearing surface has a convex cross-sectional shape, as seen in a radial plane extending radially from the central geometrical axis of the support ring, the bearing surface having a convex shape in the sense that a central portion of the bearing surface, as seen along the central geometrical axis, of the bearing surface bulges inwardly towards the central geometrical axis.

6. The agitator according to claim 1, wherein the support ring is made of metal.

7. The agitator according to claim 1, wherein the bearing surface is configured to allow the lower portion of the rotatable shaft to slidably move up and down relative to the bearing surface.

8. The agitator according to claim 1, the shaft support comprising a support structure configured to extend downwardly and to be attached to a bottom of a tank into which the rotatable shaft is intended to extend into.

9. The agitator according to claim 8, wherein the support structure is configured to be attached centred relative to a geometrical point where the shaft axis intersects the bottom of the tank.

10. The agitator according to claim 1, wherein the lower portion of the agitator shaft is provided with a bushing configured to interact with the bearing surface of the shaft support.

11. The agitator according to claim 10, wherein the bushing is composed of polymer-based or ceramic-based material.

12. The agitator according to claim 10, wherein the bushing is made of a material being softer than the material forming the bearing surface.

13. The agitator according to claim 1, wherein there is a radial play between the bearing surface and the lower portion of the agitator shaft.

14. The agitator according to claim 13, wherein the bearing surface defines a smallest geometrical cylinder of free space along the shaft axis, the smallest geometrical cylinder of free space having a diameter being larger than the diameter of the lower portion of the agitator shaft.

15. The agitator according to claim 10, wherein the bushing is composed of polymer-based or ceramic-based food grade material.

16. The agitator according to claim 10, wherein there is a radial play between the bearing surface and the bushing at the lower portion of the agitator shaft.

17. The agitator according to claim 16, wherein the bearing surface defines a smallest geometrical cylinder of free space along the shaft axis, the smallest geometrical cylinder of free space having a diameter being larger than the diameter of the bushing at the lower portion of the agitator shaft.

18. The agitator according to claim 14, wherein the smallest geometrical cylinder of free space has a diameter at least 5% larger than the diameter of the lower portion of the agitator shaft.

19. The agitator according to claim 14, wherein the smallest geometrical cylinder of free space has a diameter at least 1% larger than the diameter of the lower portion of the agitator shaft.

20. A shaft in combination with a shaft support,
the shaft being a rotatable shaft that is rotatable about a shaft axis and that is configured to be connected to and extend downwardly from a drive arrangement for rotating the rotatable shaft about the shaft axis, the rotatable shaft having an outer envelope surface and including a lower portion;
the shaft support supporting the lower portion of the rotatable shaft and including a support ring having an inwardly facing bearing surface that forms a slide bearing journaling the lower portion of the rotatable shaft, the inwardly facing bearing surface circumscribing the lower portion of the rotatable shaft and having a circular extension that extends circularly around a central geometrical axis of the support ring so that a distance from the central geometrical axis of the support ring to the bearing surface is equal in each point around the circular extension of the bearing surface in a first plane having a normal parallel to the central geometrical axis; and
the support ring being in a tilted position relative to the rotatable shaft such that the support ring is tilted relative to a second plane having a normal parallel to the shaft axis such that the bearing surface has a non-circular shape as seen in a projection in the second plane, a first distance measured in a first direction in the second plane and being a longest distance between the bearing surface and the outer envelope surface of the shaft being larger than a second distance measured in a second direction in the second plane and being a shortest distance between the bearing surface and the outer envelope surface of the shaft, the second distance being less than 70% of the first distance.

21. The shaft in combination with the shaft support according to claim 20, further comprising at least one elongated rod having one end connected to the support ring and an opposite end configured to be connected to a bottom of a tank to hold the support ring in the tilted position.

22. The shaft in combination with the shaft support according to claim 20, further comprising a plurality of elongated rods each having one end connected to the support ring and an opposite end configured to be connected to a bottom of a tank to hold the support ring in the tilted position.

23. The shaft in combination with the shaft support according to claim 22, wherein each of the plurality of elongated rods has a different length.

24. A shaft in combination with a shaft support,
the shaft being a rotatable shaft that is rotatable about a shaft axis and that is configured to be connected to and extend downwardly from a drive arrangement for rotating the rotatable shaft about the shaft axis, the rotatable shaft having an outer envelope surface and including a lower portion;
the shaft support supporting the lower portion of the rotatable shaft and including a support ring having an inwardly facing bearing surface that forms a slide bearing journaling the lower portion of the rotatable shaft, the inwardly facing bearing surface facing the outer envelope surface of the lower portion of the rotatable shaft and circumscribing the lower portion of the rotatable shaft; and the support ring being fixed in a tilted position relative to the rotatable shaft such that the support ring is tilted relative to a plane having a normal parallel to the shaft axis such that the bearing surface has a non-circular shape as seen in a projection in the plane having the normal parallel to the shaft axis, a first distance measured in a first direction in the plane and being a longest distance between the bearing surface and the outer envelope surface of the shaft being larger than a second distance measured in a second direction in the plane and being a shortest distance between the bearing surface and the outer envelope surface of the shaft, the second distance being less than 70% of the first distance.

\* \* \* \* \*